(12) United States Patent
Tsai et al.

(10) Patent No.: US 8,422,734 B1
(45) Date of Patent: Apr. 16, 2013

(54) METHOD FOR PROCESSING IMAGES

(71) Applicant: National Central University, Jhongli (TW)

(72) Inventors: Tsung-Han Tsai, Jhongli (TW); Hsueh-Yi Lin, Jhongli (TW)

(73) Assignee: National Central University, Jhongli, Taoyuan County (TW)

( * ) Notice: Subject to any disclaimer, the term of this patent is extended or adjusted under 35 U.S.C. 154(b) by 0 days.

(21) Appl. No.: 13/647,591

(22) Filed: Oct. 9, 2012

(30) Foreign Application Priority Data

Apr. 18, 2012 (TW) .............................. 101113794 A

(51) Int. Cl.
*G06K 9/00* (2006.01)
*H04N 5/14* (2006.01)
*H04N 1/40* (2006.01)

(52) U.S. Cl.
USPC ............................ 382/100; 348/571; 358/448

(58) Field of Classification Search .................. 382/100, 382/103, 107, 235, 236, 276, 307; 348/154, 348/155, 211.1, 222.1, 352, 407.1, 451, 452, 348/571; 358/3.23, 448, 530
See application file for complete search history.

(56) References Cited

U.S. PATENT DOCUMENTS

| 5,652,629 A * | 7/1997 | Gonzales et al. ............. 348/699 |
| 7,526,028 B2 * | 4/2009 | Sung et al. ............... 375/240.16 |

FOREIGN PATENT DOCUMENTS

| TW | 200629899 | 8/2006 |
| TW | 200922335 | 5/2009 |

OTHER PUBLICATIONS

English translation of abstract of TW 200922335.
English translation of abstract of TW 200629899.
D. Wang, L. Zhang, and A. Vincent, "Motion-compensated frame rate up-conversion—part I: Fast multi-frame motion estimation," IEEE Translations on Broadcasting, vol. 56, No. 2, pp. 133-141, 2010.
B.D. Choi, J.-W. Han, C.-S. Kim, and S.-j. Ko, "Motion-compensated frame interpolation using bilateral motion estimation and adaptive overlapped block motion compensation," IEEE Transactions on Circuits and Systems for Video Technology, vol. 17, No. 4, Apr. 2007.
B.-T. Choi, S.-H. Lee, and S.-J. Ko, "New frame rate up-conversion using bi-directional motion estimation," IEEE Transactions on Consumer Electronics, vol. 46, No. 3, pp. 603-609, Aug. 2000.
S.-J. Kang, K.-R. Cho, and Y.H. Kim, "Motion compensated frame rate up-conversion using extended bilateral motion estimation," IEEE Transactions on Consumer Electronics, vol. 53, No. 4, pp. 1759-1767, 2007.

(Continued)

*Primary Examiner* — Abolfazl Tabatabai
(74) *Attorney, Agent, or Firm* — McClure, Qualey & Rodack, LLP

(57) ABSTRACT

A method for processing an image includes capturing a current frame and a previous frame and performing uni-directional motion estimation on the same for obtaining an initial motion vector; performing motion compensated interpolation with respect to the current and previous frames, and the motion vector for acquiring an interpolated frame; calculating and obtaining second motion vectors corresponding to target blocks in the current frame symmetrically using the interpolated block as a center; calculating and obtaining third motion vectors corresponding to the second motion vectors in the previous frame; obtaining distance values using a motion trajectory calibration process with respect to the second and third motion vectors; and obtaining the minimum distance value from the distance values and performing a bi-directional motion compensation process with respect to the motion trajectory corresponding to the minimum distance value obtained from the distance values.

10 Claims, 7 Drawing Sheets

OTHER PUBLICATIONS

D. Wang, A. Vincent, P. Blanchfield, and R. Klepko, "Motion-compensated frame rate up-conversion—part II: New algorithms for frame interpolation," IEEE Transactions on Broadcasting, vol. 56, No. 2, pp. 142-149, 2010.

T.-H. Tsai, H.-G. Chen, and H.-Y. Lin, "Frame rate up-conversion using adaptive bilateral motion estimation," in WSEAS International Conference on Multimedia Systems and Signal Processing, 2009.

T.-H. Tsai, H.-Y. Lin, and H.-G. Chen, "Overlapped block-based adaptive bilateral motion estimation," in Asia Pacific Conference on Circuits and Systems, 2010, to be published.

T.-H. Tsai, H.-Y. Lin, "high visual quality particle based frame rate up conversion with acceleration assisted motion trajectory calibaration", vol. 8, No. 6, Jun. 2012.

* cited by examiner

METHOD FOR PROCESSING IMAGES

RELATED APPLICATIONS

This application claims priority to Taiwan Patent Application Serial Number 101113794, filed Apr. 18, 2012, the entirety of which is herein incorporated by reference.

BACKGROUND

1. Technical Field Disclosure

The embodiment of the present disclosure relates generally to a method, and, more particularly, to a method for processing images.

2. Description of Related Art

In recent years, liquid crystal displays (LCDs) have gradually replaced conventional cathode-ray tube (CRT) displays as a result of their advantages, such as their light weight, compact size, low power-consumption, and minimal radiation emission. LCDs employ a maintenance type of display technique, characterized in that the current image brightness is maintained until the next image is refreshed. That is, the current image is maintained for as long as necessary until a new image is required.

Due to the persistence of vision experienced by human eyes, the longer the current image is maintained by an LCD, the longer it is perceived by the retina. In addition, when viewing an object, human eyes follow the motion trajectory of the object so as to clearly observe the moving object, regardless of whether the object moves linearly or non-linearly. Combined together, these features lead to a phenomenon called afterimage, in which the periphery of a moving object is perceived to be blurred due to the overlapping of the previous image persisted on the retina and the current image.

Blurring effect refers to the phenomenon caused by the combination of the image-maintaining characteristics of the LCD and the vision persistence of human eyes that results in the overlapping of adjacent images. For example, when the image refreshes, the previous image resulted from the vision persistence overlaps with the current image, thereby causing the blurring effect of the object which may cause discomfort to the viewer.

The most commonly employed motion estimation techniques are bi-directional motion estimation and uni-directional motion estimation. Bi-directional motion estimation is different from conventional motion estimation in that it takes the aspect of a block of an interpolated frame and finds an optimal comparing block by symmetrically searching the search range of two adjacent frames, and then obtains a motion trajectory passing through the block of the interpolated frame as the motion vector. On the other hand, uni-directional motion estimation uses the current frame as the starting point to perform motion estimation and image compensation.

However, bi-directional motion estimation may result in estimation error; for example, when a simple or plain background is present behind an object, bi-directional motion estimation may erroneously detect the background value. One disadvantage of uni-directional motion estimation is that it has a motion blank region or motion overlapping region which greatly degrades image quality.

SUMMARY

A method for processing images is provided to address the problem of estimation error encountered by bi-directional motion estimation. For example, when an object is laid over a background, bi-directional motion estimation may detect the background, thereby resulting in estimation error. In addition, the present method may also alleviate image degradation caused by uni-directional motion estimation. Image degradation results from the presence of a motion blank region or a motion overlapping region.

In view of the foregoing, one aspect of the embodiment of the present disclosure is to provide a method for processing images. The method for processing images comprises the following steps:

obtaining a current frame and a previous frame;

performing uni-directional motion estimation with respect to the current frame and the previous frame for obtaining an initial motion vector;

performing a motion compensation process with respect to the current frame, the previous frame, and the initial motion vector for obtaining an interpolated frame;

determining the search center and block size of each of the interpolated blocks based on the interpolated frame;

calculating and obtaining a plurality of second motion vectors corresponding to a plurality of target blocks in the current frame symmetrically through using the interpolated block as a center;

calculating and obtaining a plurality of third motion vectors corresponding to the second motion vectors in the previous frame;

obtaining a plurality of distance values by performing a motion trajectory calibration process with respect to the second motion vectors and the third motion vectors; and obtaining a minimum distance value from the distance values by comparing the distance values and performing a bi-directional motion compensation process with respect to the motion trajectory corresponding to the minimum distance value obtained from the distance values.

In another embodiment of the present disclosure, the method for processing images further comprises the following steps:

setting a compensation range, wherein the compensation range is half of the search range, wherein the step of calculating and obtaining a plurality of second motion vectors corresponding to a plurality of target blocks in the current frame symmetrically through using the interpolated block as the center comprises calculating and obtaining a plurality of second motion vectors corresponding to a plurality of target blocks symmetrically in the compensation range of the current frame through using the interpolated block as a center.

In yet another embodiment of the present disclosure, the distance values are generated from the following formula:

$$dist(T, C) = \frac{5}{8}MV_{1g}(x, y) - \frac{1}{8}MV_{2g}(x + v_x, y + v_y) + (off_x, off_y),$$

where $MV_{1g}$ is the second motion vector, $MV_{2g}$ is the third motion vector, (x,y) is the coordinates of the target block in the current frame, $(v_x, v_y) = MV_{1g}(x,y)$ and $(x+off_x, y+off_y)$ are the coordinates of the interpolated block in the interpolated frame.

In still another embodiment of the present disclosure, the step of performing the uni-directional motion estimation comprises the following steps:

dividing the current frame and the previous frame into a plurality of blocks according to a predetermined block size;

the current frame and the previous frame respectively comprising a motion search range, of the motion search ranges, performing a sum of absolute difference algorithm with respect to each of base blocks selected from the blocks and each candidate blocks selected from the blocks to generate a plurality of sum of absolute differences; and obtaining the minimum sum of absolute difference from the sum of absolute differences by comparing the sum of absolute differences, and calculating and obtaining the initial motion vector according to the base block which is used to calculate the minimum sum of absolute difference and the candidate block.

In yet another embodiment of the present disclosure, the adaptive sum of color-oriented particle distance (ASCOPD) is generated by the following formula:

$$ASCOPD(dx+dy) = \sum_{(x,y) \in S} dist(f_{n-1}(x-dx, y-dy), f_n(x, y)) + A(dx, dy),$$

$$A(dx, dy) = (dx^2 + dy^2) + BSME^2,$$

where $f_{n-1}$ is the previous frame, $f_n$ is the current frame, (x,y) is the coordinate of the target block in the current frame, and BSME is the block size of the motion estimation.

In still another embodiment of the present disclosure, the bi-directional sum of absolute difference (BSAD) is generated from the following formula:

$$BSAD = dist(f_{n-1}\{(x, y) + MV_{bi-direct}\}, f_n\{(x, y) - MV_{bi-direct}\}),$$

$$dist(f_{n-1}(B_1), f_n(B_2)) = [|Y_{n-1}(B_1) - Y_n(B_2)| +$$

$$W(|Cr_{n-1}(B_1) - Cr_n(B_2)| + |Cb_{n-1}(B_1) - Cb_n(B_2)|) \forall\ W \in \aleph]$$

$$MV_{bi-direct} = \frac{1}{2} \times \arg\{\min(dist(traj\_entry\_pt, cur\_interp\_block))\},$$

$$B_1 = (x, y) + MV_{bi-direct},$$

$$B_2 = (x, y) - MV_{bi-direct},$$

where (x,y) is the coordinate of the current interpolated block in the interpolated frame, $Y_{n-1}$, $Y_n$, $Cr_{n-1}$, $Cr_n$, $Cb_{n-1}$, $Cb_n$ are the chrominance compositions of YCrCb color space in the current frame $f_n$ and the previous frame $f_{n-1}$, W is an integer, and cur_interp_block is the location of the current interpolated block.

In yet another embodiment of the present disclosure, the method for processing images further comprises the following steps:

performing a reducing process with respect to the image of the current frame and the previous frame twice to generate an image with three resolution levels, wherein the resolution level the image of the current frame and the previous frame locates is the first resolution level, the resolution level is the second resolution level if the resolution level has been reduced once, and the resolution level is the third resolution level if the resolution level has been reduced twice;

performing a motion estimation with respect to the image located at the third resolution level to generate the initial motion vector;

enlarging the initial motion vector according to the size of the second resolution level and performing a motion vector refinement process with respect to the second resolution level to thereby generate a fourth motion vector according to the initial motion vector; and enlarging the fourth motion vector according to the size of the first resolution level and performing the motion vector refinement process with respect to the first resolution level to thereby generate a fifth motion vector according to the fourth motion vector.

In another embodiment of the present disclosure, the method for processing images further comprises the following steps:

performing the motion vector refinement process with respect to the second resolution level and the first resolution level by a median filter.

In yet another embodiment of the present disclosure, the median filter is defined as the following formula:

$$MV_{1g\_med} = \arg\left[\min_{(dx,dy) \in N_{MVc}} \left( \sum_{(i,j) \in N_{MVc}} dist(MV(dx, dy), MV(i, j)) \right)\right],$$

$$dist(MV_1, MV_2) = |X_{MV_1} - X_{MV_2}| + |Y_{MV_1} - Y_{MV_2}|,$$

$$(dx, dy) \in [-2, 2], (i, j) \in [-2, 2],$$

where $MV_{1g\_med}$ is the candidate motion vector refined by the median filter, $N_{MVc}$ is the union of 25 neighboring and current motion vectors, $(dx,dy) \in [-2,2]$ and $(i,j) \in [-2,2]$ are the indexes of neighboring and current motion vectors.

As a result, the embodiments of the present disclosure provide a method for processing images to address the problem of estimation error encountered by bi-directional motion estimation. For example, when an object is laid over a background, bi-directional motion estimation may detect the background, thereby resulting in estimation error. In addition, the present method may also alleviate image degradation caused by uni-directional motion estimation. Image degradation results from the presence of a motion blank region or a motion overlapping region.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
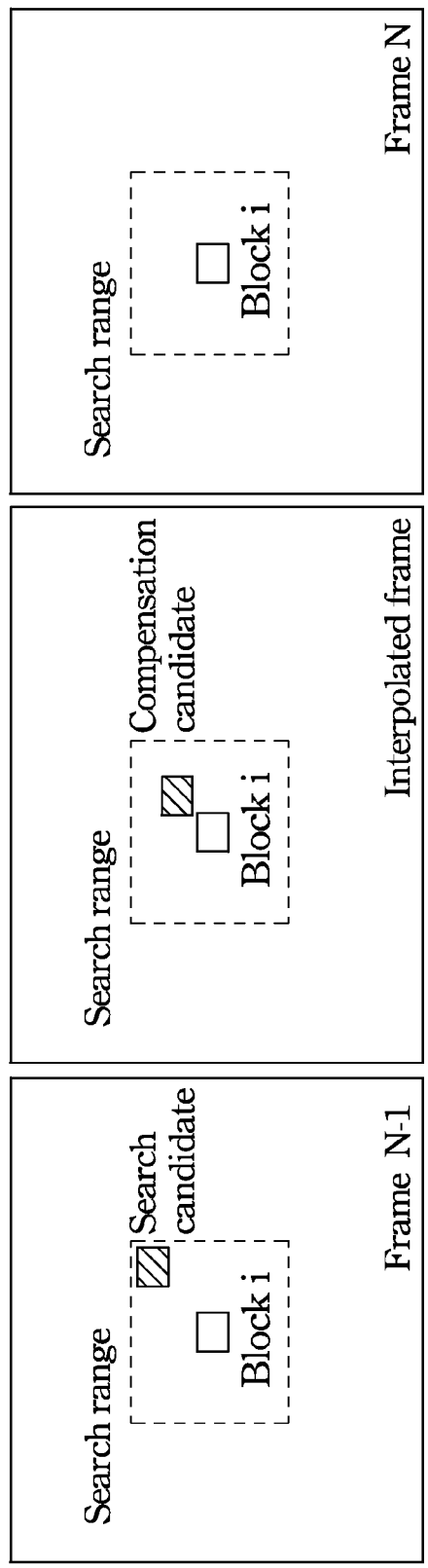
FIG. 1 schematically shows a diagram of uni-directional motion estimation according to embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

As used herein, the terms "comprising," "including," "having," "containing," "involving," and the like are to be understood to be open-ended, i.e., to mean including but not limited to.

FIG. 1 schematically shows a diagram of uni-directional motion estimation (UME) according to embodiments of the present disclosure. Before proceeding further to a particle based motion trajectory, an initial motion vector should be obtained first. The obtaining process is as shown in FIG. 1. First of all, a block size is set, and an image is divided into a plurality of blocks according to said block size. A search range is also set as shown in FIG. 1. Of the current frame Fn and the previous frame Fn-1, the sum of absolute difference algorithm is performed with respect to each of block i selected from the blocks and each candidate blocks selected from the search range to generate a plurality of sum of absolute differences.

The minimum sum of absolute difference is obtained by comparing the sum of absolute differences calculated from the block i and the candidate block. The motion vector corresponding to the minimum sum of absolute difference is the initial motion vector. The formula for sum of absolute difference (SAD) is as follows:

$$SAD = \sum_{i=0}^{N-1}\sum_{j=0}^{M-1}(|f_n(x-h+i, y-k+j) - f_{n-1}(x+h+i, y+k+j)|),$$

where $f_{n-1}$ is the block pixel value of the previous frame, $f_n$ is the block pixel value in the search range of the current frame, x and y are the coordinates of the block, i and j are the pixel addresses in the block, and h and k are the addresses in the search matching block (the search range center is used as the original point).

Figure 2:
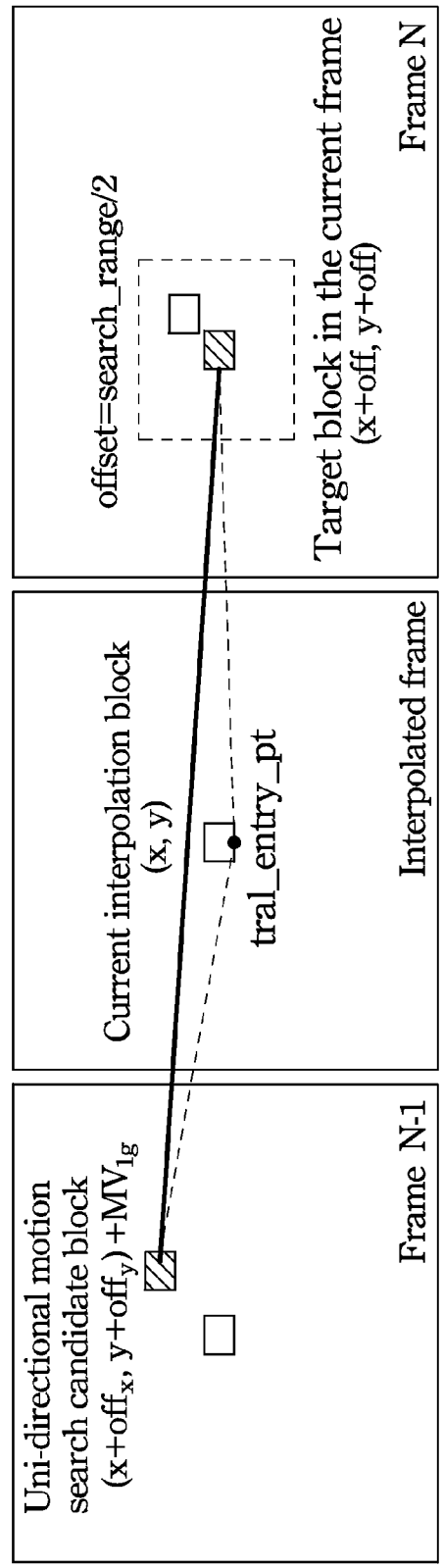
FIG. 2 schematically shows a diagram of motion trajectory calibration according to embodiments of the present disclosure.

FIG. 2 schematically shows a diagram of motion trajectory calibration according to embodiments of the present disclosure. Compared with the prior art, which merely uses a search technique to rebuild an image-lost frame, the embodiment of the present invention provides particle based motion trajectory calibration. According to Newtonian mechanics, an object will accelerate when an external force acts upon the object. As shown in FIG. 2, motion estimation is performed between the current frame and the previous frame to find a corresponding motion vector. In addition, the motion vector of the previous frame is also recorded for performing non-linear motion estimation.

In conventional linear motion estimation, linear motion estimation is not accurate enough, and there will be a miscalculation. In this regard, it is better to use a quadratic equation to estimate the motion trajectory. In reality, there will be a motion trajectory corresponding to the object when the object is accelerated due to an external force acting on the object. A quadratic equation can perform motion trajectory calibration to motion vectors generated from the current frame and the previous frame.

Distance information is generated according to the distance between the intersection point of the trajectory in the interpolated frame and the target needed to be compensated. If the intersection point is near the target needed to be compensated, the trajectory can be the motion trajectory which passes through the compensation target. If the nearest trajectory is selected, the motion compensation processes can be performed according to the trajectory. The formula for the intersection point of the trajectory in the interpolated frame is defined as follows:

$$\text{traj\_entry\_pt} = \frac{5}{8}MV_{1g}(x, y) - \frac{1}{8}MV_{2g}(x+v_x, y+v_y) + (x, y) + (\text{off}_x, \text{off}_y),$$

$$(v_x, v_y) = MV_{1g}(x, y),$$

where $MV_{1g}$ is the motion vector of the current frame, $MV_{2g}$ is the motion vector of the previous frame, (x,y) is the coordinate of the target block in the current frame, $(v_x, v_y) = MV_{1g}(x,y)$ and $(x+\text{off}_x, y+\text{off}_y)$ is the coordinate of the interpolated block in the interpolated frame. The formula for the distance between the intersection point of the trajectory in the interpolated frame and the target needed to be compensated is defined as follows:

$$dist(T, C) = \frac{5}{8}MV_{1g}(x, y) - \frac{1}{8}MV_{2g}(x+v_x, y+v_y) + (\text{off}_x, \text{off}_y).$$

Figure 3:
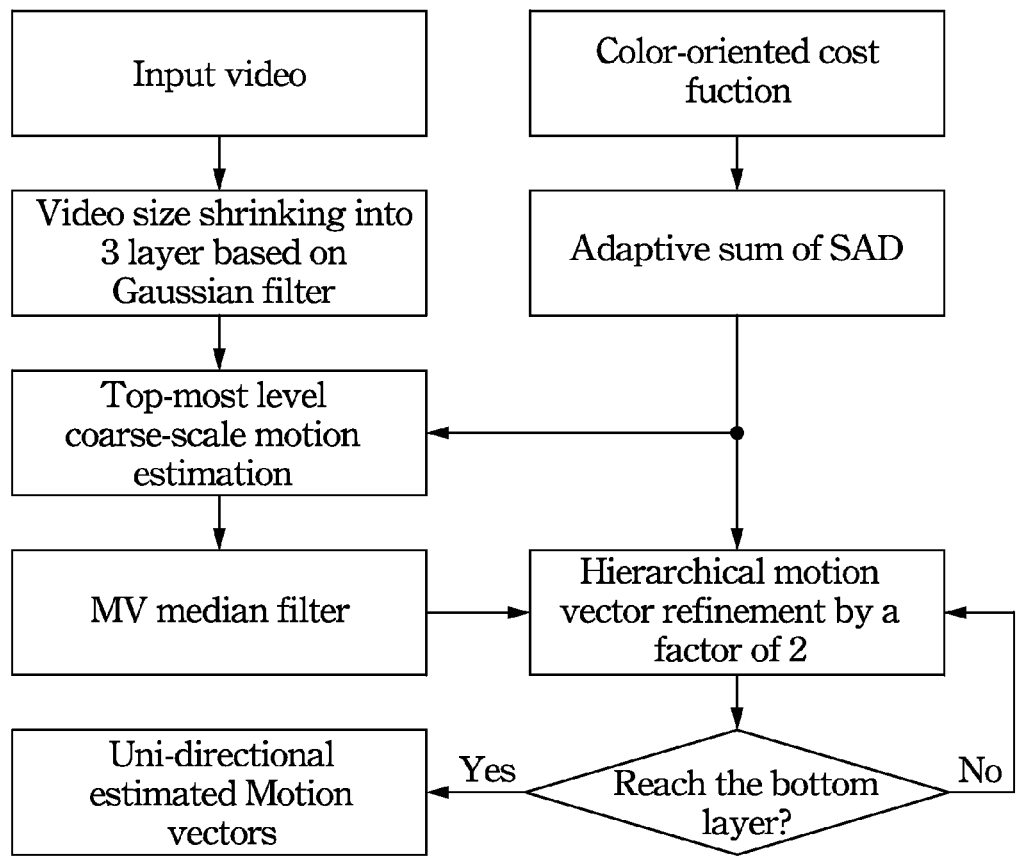
FIG. 3 schematically shows a flow diagram of pixel based uni-directional motion estimation according to embodiments of the present disclosure.
Figure 4:
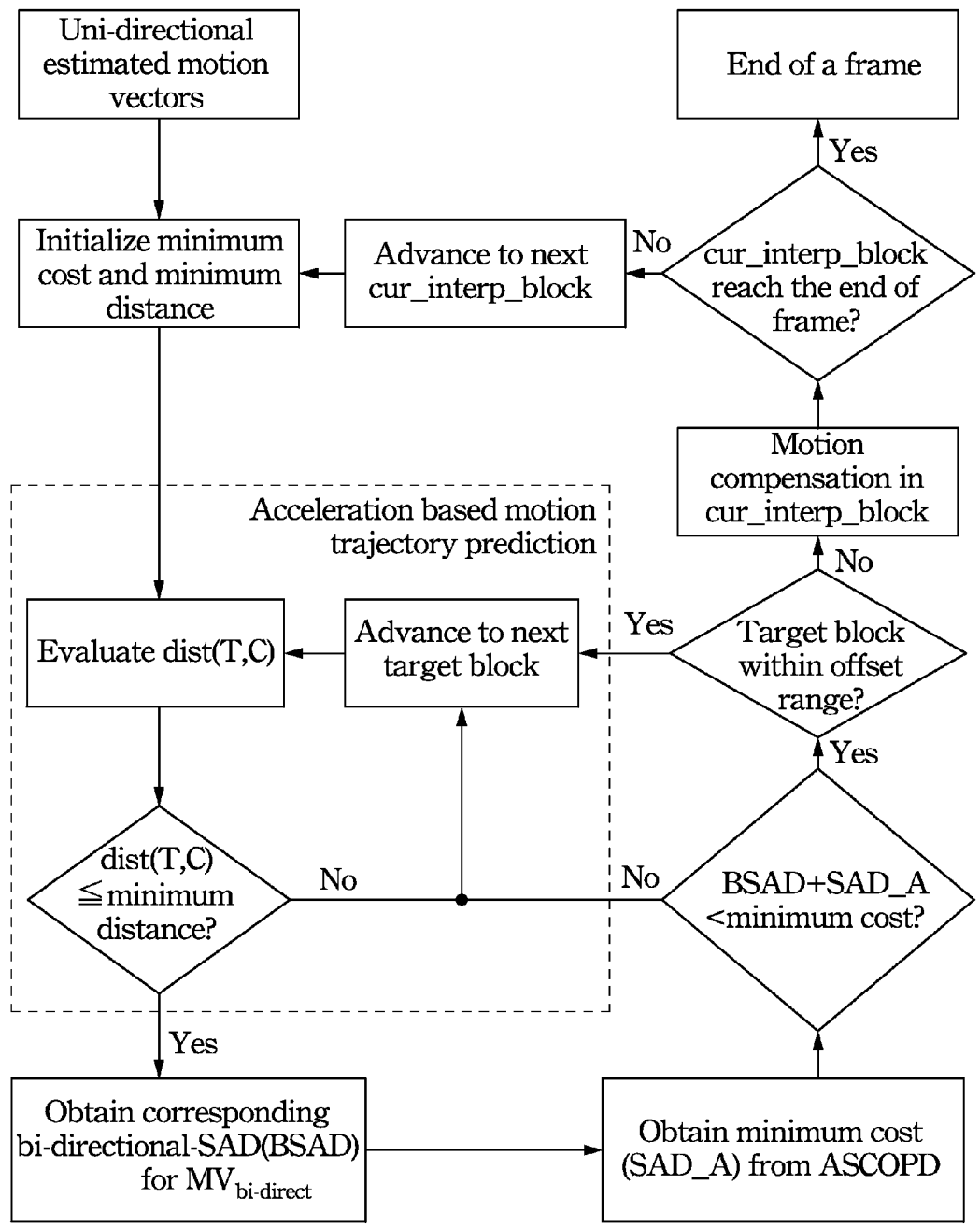
FIG. 4 schematically shows a flow diagram of particle based motion estimation according to embodiments of the present disclosure.

FIG. 3 schematically shows a flow diagram of pixel based uni-directional motion estimation according to embodiments of the present disclosure. FIG. 4 schematically shows a flow diagram of particle based motion trajectory calibration according to embodiments of the present disclosure. Because the efficiency of the conventional search technique is low, a new motion estimation mechanism is provided herein which combines bi-directional motion estimation and uni-directional motion estimation.

First of all, as shown in FIG. 3, the pixel based motion estimation employs uni-directional motion estimation to generate a series of motion vectors. The motion vector matrix generated from the technique described with reference to FIG. 1 is then transmitted to particle based motion trajectory calibration as shown in FIG. 4, and the motion vector matrix is processed. Motion compensation is also performed with respect to the motion vector matrix. After the motion vector transmitted by pixel based motion estimation is processed by acceleration based motion trajectory prediction, a series of distance values can be obtained.

If the distance value is less than a predetermined minimum threshold value, bi-directional motion prediction is performed with respect to a motion vector corresponding to the distance value to generate a bi-directional sum of absolute difference. The bi-directional sum of absolute difference (BSAD) can be calculated by the following formula:

$$BSAD = dist(f_{n-1}\{(x, y) + MV_{bi-direct}\}, f_n\{(x, y) - MV_{bi-direct}\}),$$
$$dist(f_{n-1}(B_1), f_n(B_2)) = [|Y_{n-1}(B_1) - Y_n(B_2)| +$$
$$W(|Cr_{n-1}(B_1) - Cr_n(B_2)| + |Cb_{n-1}(B_1) - Cb_n(B_2)|) \forall\ W \in \aleph]$$
$$MV_{bi-direct} = \frac{1}{2} \times \arg\{\min(dist(\text{traj\_entry\_pt, cur\_interp\_block}))\},$$
$$B_1 = (x, y) + MV_{bi-direct},$$
$$B_2 = (x, y) - MV_{bi-direct},$$

where (x,y) is the coordinate of the current interpolated block in the interpolated frame, $Y_{n-1}$, $Y_n$, $Cr_{n-1}$, $Cr_n$, $Cb_{n-1}$, $Cb_n$ are the chrominance compositions of YCrCb color space in the current frame $f_n$ and the previous frame $f_{n-1}$, W is an integer, and cur_interp_block is the location of the current interpolated block.

Afterward, the selected motion vector is determined according to the bi-directional sum of absolute difference and the sum of absolute difference value corresponding to each of the blocks obtained from the pixel based motion estimation, and the motion compensation procedure is performed according to the selected motion vector. When performing the sum of absolute difference, the color composition as shown in FIG. 3 is referred to. Furthermore, an adaptive sum of absolute difference, a color oriented cost function, and adaptive sum of color oriented particle distance (ASCOPD) can be obtained by the following formula:

$$ASCOPD(dx + dy) = \sum_{(x,y) \in S} dist(f_{n-1}(x - dx, y - dy), f_n(x, y)) + A(dx, dy),$$
$$A(dx, dy) = (dx^2 + dy^2) + BSME^2,$$

where $f_{n-1}$ is the previous frame, $f_n$ is the current frame, (x,y) is the coordinate of the target block in the current frame, and BSME is the block size of the motion estimation.

For correcting the wrong motion vector, a motion vector refinement process is performed with respect to the motion vector generated from uni-directional motion estimation by a median filter. The definition of the median filter is as follows:

$$MV_{1g\_med} = \arg\left[\min_{(dx,dy) \in N_{MVc}} \left(\sum_{(i,j) \in N_{MVc}} dist(MV(dx, dy), MV(i, j))\right)\right],$$
$$dist(MV_1, MV_2) = |X_{MV_1} - X_{MV_2}| + |Y_{MV_1} - Y_{MV_2}|,$$
$$(dx, dy) \in [-2, 2], (i, j) \in [-2, 2],$$

where $MV_{1g\_med}$ is the candidate motion vector refined by the median filter, $N_{MVc}$ is the union of 25 neighboring and current motion vectors, and (dx,dy)∈[−2,2] and (i,j)∈[−2,2] are the indexes of neighboring and current motion vectors.

Furthermore, the detailed operating steps as illustrated in FIG. 3 are described below. The input video is first compressed based on the Gaussian filter into several layers according to input video resolution. Uni-directional motion estimation is first performed by evaluating adaptive sum of color-oriented particle distance at the topmost layer to obtain the initial motion vectors. The initial motion vectors are processed by the median filter to further enhance search accuracy.

Two steps are taken to realize the median filter. First, the median filter activation criterion, the outlier detection signal, is applied to decide whether the median filter is applicable or not. Second, the median filter is realized by referencing 25 neighboring motion vectors, as formulated in the description as mentioned above. When the sum of the distances between $MV_{(dx,dy)}$ and all $MV_{(i,j) \in N_{MVc}}$ is minimum, $MV_{(dx,dy)}$ is assigned to $MV_{1g\_med}$.

When the initial motion vectors pass through the median filter, a motion vector refinement is recursively performed within the range of −1 to +1 until the lowest layer in the pyramid is reached. Finally, a uni-directional estimated motion vector is recorded for the particle based motion trajectory calibration process.

Moreover, the detailed operating steps as illustrated in FIG. 4 are described below. Particle based motion trajectory calibration is composed of two procedures, and these include acceleration based motion trajectory prediction and uni-directional/bi-directional cost function joint-minimization. At the beginning of particle based motion trajectory calibration, the minimum cost and the minimum distance value are initialized to the maximum of integer.

Afterward, acceleration based motion trajectory prediction is executed to evaluate dis(T,C). If the distance is less than the minimum one, the bi-directional sum of absolute difference and the sum of absolute difference A can be obtained by the above-mentioned formula. If the sum of the bi-directional sum of absolute difference and the sum of absolute difference A are smaller than the minimum cost, the corresponding $MV_{bi-direct}$ can be selected as the final bi-directional motion vector ($MV_{bi-dir-final}$). The final bi-directional motion vector ($MV_{bi-dir-final}$) can be used in the current interpolated block for motion compensation.

Figure 5:
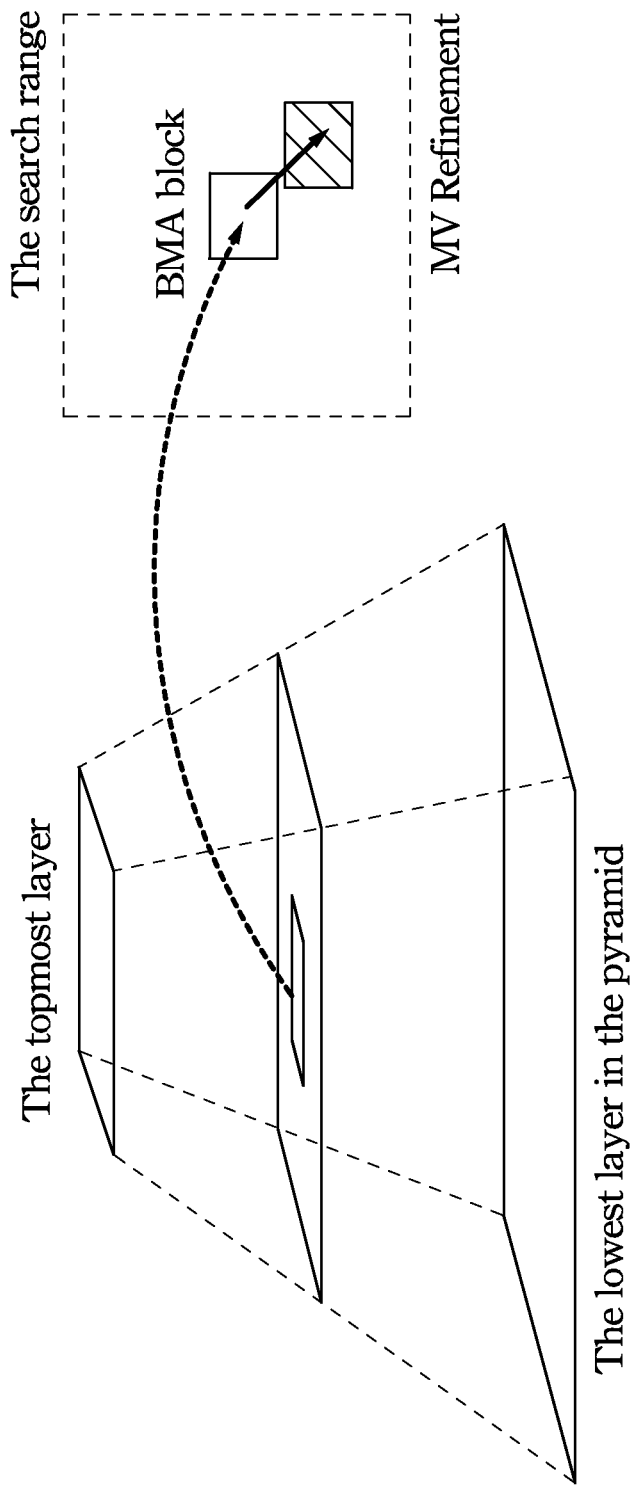
FIG. 5 schematically shows a diagram of a pyramid motion search structure according to embodiments of the present disclosure.

FIG. 5 schematically shows a diagram of a pyramid motion search structure according to embodiments of the present disclosure. As illustrated in FIG. 5, in the pyramid search methodology, one video frame is first compressed by a factor of two into several layers. Afterward, motion estimation is performed from the topmost layer (the smallest video). When the initial motion vectors are generated, a motion refinement process is performed based on the existing motion vectors with proper scaling.

Figure 6:
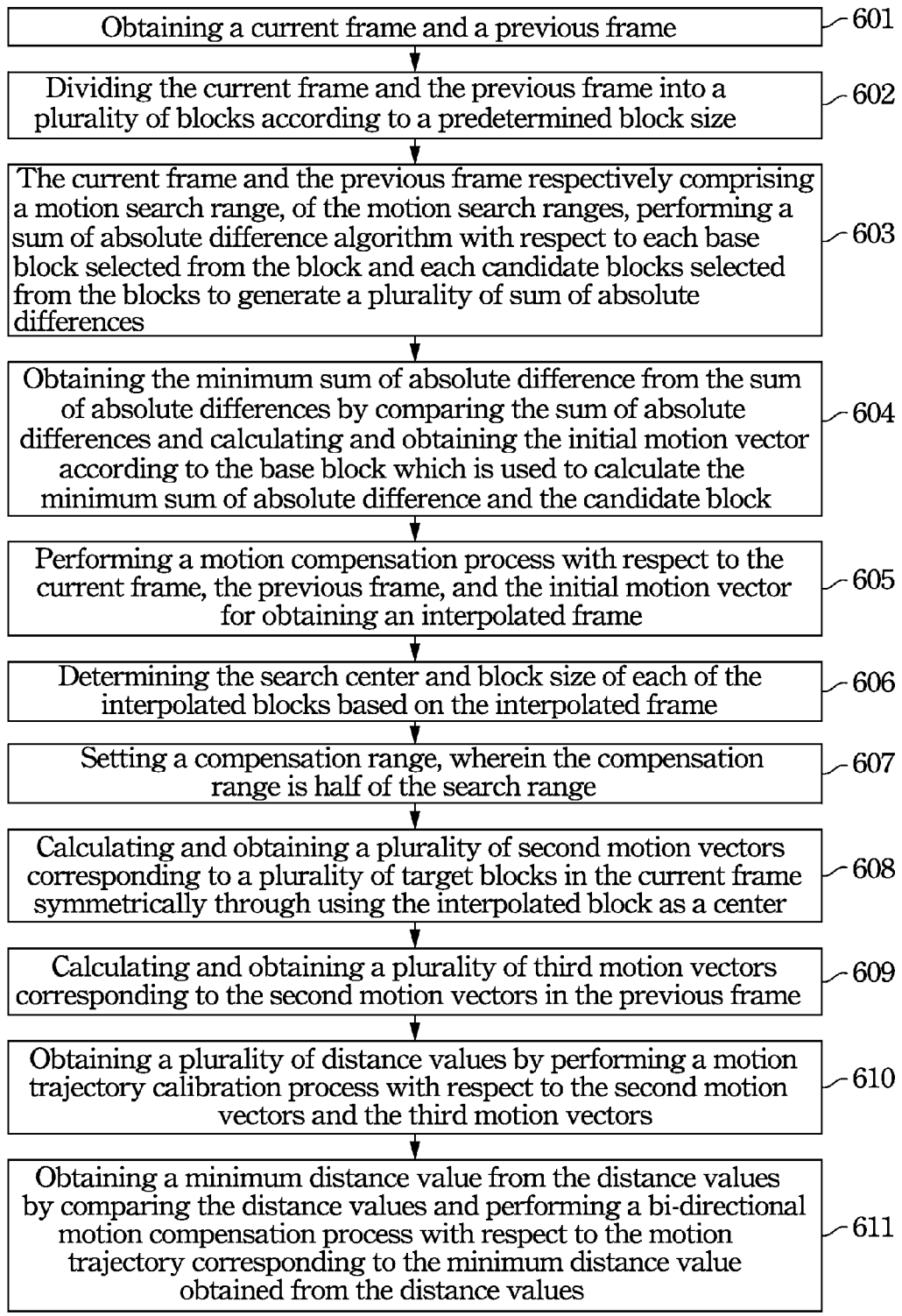
FIG. 6 schematically shows a flow diagram of a method for processing images according to embodiments of the present disclosure.

FIG. 6 schematically shows a flow diagram of a method for processing images according to embodiments of the present disclosure. According to one embodiment of the present invention, the method for processing images comprises the following steps:

obtaining a current frame and a previous frame (step 601), and performing uni-directional motion estimation with respect to the current frame and the previous frame for obtaining an initial motion vector;

performing a motion compensation process with respect to the current frame, the previous frame, and the initial motion vector for obtaining an interpolated frame (step 605);

determining the search center and block size of each of the interpolated blocks based on the interpolated frame (step 606);

calculating and obtaining a plurality of second motion vectors corresponding to a plurality of target blocks in the current frame symmetrically through using the interpolated block as a center (step 608);

calculating and obtaining a plurality of third motion vectors corresponding to the second motion vectors in the previous frame (step 609);

obtaining a plurality of distance values by performing a motion trajectory calibration process with respect to the second motion vectors and the third motion vectors (step 610); and obtaining a minimum distance value from the distance values by comparing the distance values and performing a bi-directional motion compensation process with respect to the motion trajectory corresponding to the minimum distance value obtained from the distance values (step 611).

For example, referring to both FIGS. 2 and 6, after the initial motion vector is obtained, the search center and block size of each of the interpolated blocks (located at (x,y)) is determined based on the interpolated frame. A compensation range (offset) is set, and the compensation range is half of the search range. A plurality of second motion vectors ($M_{1g}$) corresponding to a plurality of target blocks in the current frame symmetrically are calculated and obtained using the interpolated block as a center. A plurality of third motion vectors (MV2g(x+vx,y+vy)) corresponding to the second motion vectors in the previous frame ($f_{n-1}$) are calculated and obtained.

A plurality of distance values (dis(T,C)) are obtained by performing a motion trajectory calibration process with respect to the second motion vectors and the third motion vectors.

Of the interpolated frame, the current interpolated block of the interpolated frame is used as a center to perform particle based motion trajectory calibration with respect to the target block in the current frame of the offset range.

A minimum distance is selected from the distance coefficients, and a bi-directional motion compensation process is performed based on the minimum distance.

As a result, the method for processing images of the embodiment of the present invention is provided to address the problem of estimation error encountered by bi-directional motion estimation. For example, when an object is laid over a background, bi-directional motion estimation may detect the background, thereby resulting in estimation error. In addition, the present method may also alleviate image degradation caused by uni-directional motion estimation. Image degradation results from the presence of a motion blank region or a motion overlapping region.

In one embodiment of the present invention, the method for processing images further comprises the following steps:

setting a compensation range, wherein the compensation range is half of the search range (step 607).

In another embodiment of the present invention, the step of performing the uni-directional motion estimation of the method for processing images comprises the following steps:

dividing the current frame and the previous frame into a plurality of blocks according to a predetermined block size (step 602);

the current frame and the previous frame respectively comprising a motion search range, of the motion search ranges, performing a sum of absolute difference algorithm with respect to each base block selected from the blocks and each candidate block selected from the blocks to generate a plurality of sum of absolute differences (step 603); and obtaining the minimum sum of absolute difference from the sum of absolute differences by comparing the sum of absolute differences and calculating and obtaining the initial motion vector according to the base block which is used to calculate the minimum sum of absolute difference and the candidate block (step 604).

For example, referring to FIG. 1, based on a predetermined block size, the current frame and the previous frame can be divided into a plurality of blocks which use the predetermined block size as a standard.

Of the current frame $f_n$ and the previous frame $f_{n-1}$, the sum of absolute difference algorithm is performed with respect to each of block i selected from the blocks and each candidate block selected from the search range to generate a plurality of sum of absolute differences. The minimum sum of absolute difference is obtained by comparing the sum of absolute differences calculated from the block i and the candidate block. The motion vector corresponding to the minimum sum of absolute difference is the initial motion vector.

Figure 7:
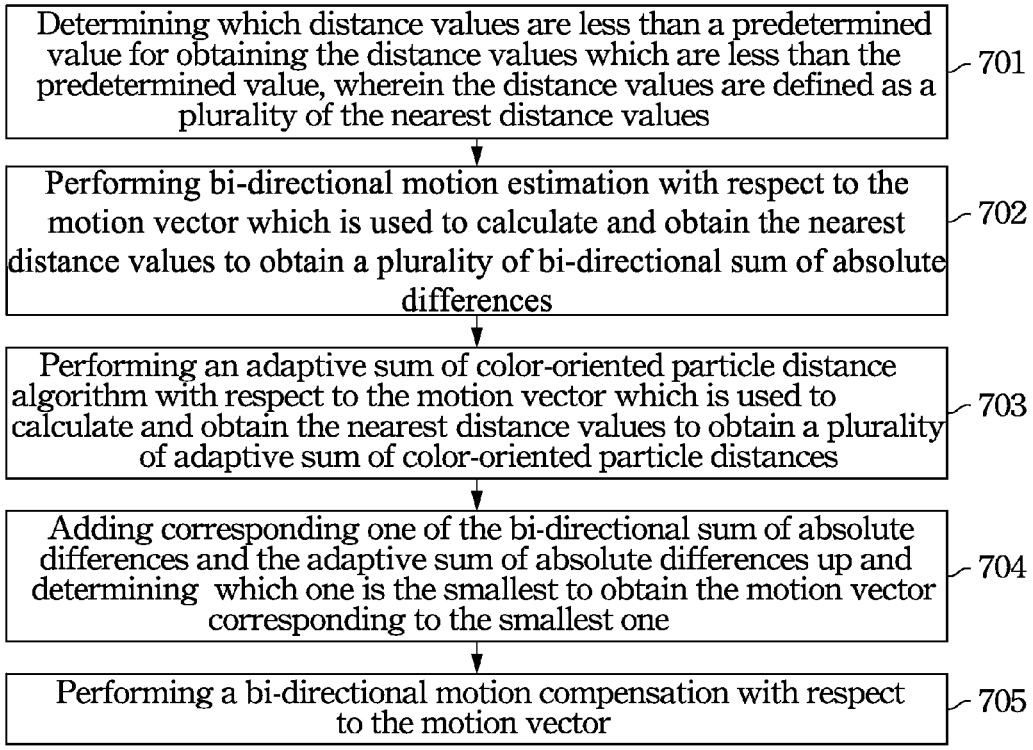
FIG. 7 schematically shows a flow diagram of a method for processing images according to embodiments of the present disclosure.

As described in FIG. 6, after the nearest distance is selected, there will be a number of motion vectors that conform to the limitation of the nearest distance. Therefore, a second stage determination is performed with respect to the obtained sum of absolute difference. Reference is now made to FIG. 7 which schematically shows a flow diagram of a method for processing images according to embodiments of the present disclosure. According to another embodiment of the present invention, the method for processing images further comprises the following steps:

determining which distance values are less than a predetermined value for obtaining the distance values which are less than the predetermined value, wherein the distance values are defined as a plurality of the nearest distance values (step 701);

performing bi-directional motion estimation with respect to the motion vector which is used to calculate and obtain the nearest distance values to obtain a plurality of bi-directional sum of absolute differences (step 702);

performing an adaptive sum of color-oriented particle distance algorithm with respect to the motion vector which is used to calculate and obtain the nearest distance values to obtain a plurality of adaptive sum of color-oriented particle distances (step 703);

adding corresponding one of the bi-directional sum of absolute differences and the adaptive sum of absolute differences up and determining which one is the smallest to obtain the motion vector corresponding to the smallest one (step 704); and performing bi-directional motion compensation with respect to the motion vector (step 705).

For example, referring to FIG. 4, a process is performed to obtain corresponding bi-directional sum of absolute differences of the motion vectors conforming the limitation of the nearest distance. The coefficient can be generated by the formula as mentioned in the description of FIG. 3.

An adaptive sum of color-oriented particle distance is performed with respect to the motion vector conforming the limitation of the nearest distance for finding corresponding sum of absolute difference A. The sum of absolute difference A is the minimum value of the sum of absolute difference as mentioned in step 604.

In addition, the bi-directional sum of absolute difference and the sum of absolute difference A are added up. Of the motion vector conforming the limitation of the nearest distance, when the value generated by adding the bi-directional sum of absolute difference and the sum of absolute difference A, the minimum value is found. The motion vector corresponding to the minimum value is defined as the final motion vector, and bi-directional motion compensation is performed with respect to the final motion vector.

Figure 8:
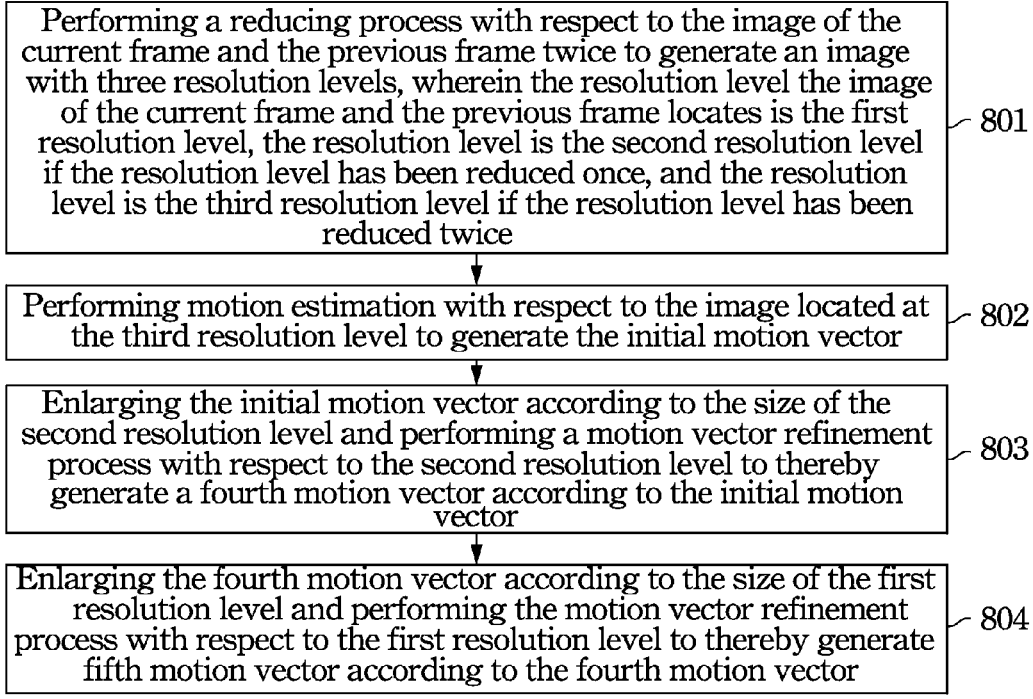
FIG. 8 schematically shows a flow diagram of a method for processing images according to embodiments of the present disclosure.

FIG. 8 schematically shows a flow diagram of a method for processing images according to embodiments of the present disclosure. The method for processing images further comprises the following steps:

performing a reducing process with respect to the image of the current frame and the previous frame twice to generate an image with three resolution levels, wherein the resolution level the image of the current frame and the previous frame locates is the first resolution level, the resolution level is the second resolution level if the resolution level has been reduced once, and the resolution level is the third resolution level if the resolution level has been reduced twice (step 801);

performing motion estimation with respect to the image located at the third resolution level to generate the initial motion vector (step 802);

enlarging the initial motion vector according to the size of the second resolution level and performing a motion vector refinement process with respect to the second resolution level to thereby generate a fourth motion vector according to the initial motion vector (step 803); and enlarging the fourth motion vector according to the size of the first resolution level and performing the motion vector refinement process with respect to the first resolution level to thereby generate a fifth motion vector according to the fourth motion vector (step 804).

For example, referring to both FIGS. 3 and 8, a reducing process is performed with respect to the original image of the current frame $f_n$ and the previous frame $f_{n-1}$ twice to generate an image with three resolution levels.

Reference is now made to both FIGS. 3 and 5. First of all, motion estimation is performed with respect to the image of the topmost layer (smallest frame) for generating an initial motion vector. After a corresponding motion vector is obtained, the median filter is used to perform a motion vector refinement process with respect to the motion vector.

Furthermore, in accordance with the lower layer, the motion vector is enlarged to conform with the current frame size, and motion vector refinement is performed with respect to the motion vector generated from the previous layer. After the lowest layer is reached, the motion vectors of all the blocks can be estimated.

Those having skill in the art will appreciate that the method for processing images can be performed with software, hardware, and/or firmware. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Those skilled in the art will recognize that optical aspects of implementations will typically employ optically oriented hardware, software, and or firmware.

In addition, those skilled in the art will appreciate that each of the steps of the method for processing images named after the function thereof is merely used to describe the technology in the embodiment of the present disclosure in detail but not limited to. Therefore, combining the steps of said method into one step, dividing the steps into several steps, or rearranging the order of the steps is within the scope of the embodiment in the present disclosure.

In view of the foregoing embodiments of the present disclosure, many advantages of the present disclosure are now apparent. The embodiment of the present disclosure provides a method for processing images to address the problem of estimation error encountered by bi-directional motion estimation. For example, when an object is laid over a background, the bi-directional motion estimation may detect the background, thereby resulting in estimation error. In addition, the present method may also alleviate image degradation caused by uni-directional motion estimation. Image degradation results from the presence of a motion blank region or a motion overlapping region.

It will be understood that the above description of embodiments is given by way of example only and that various modifications may be made by those with ordinary skill in the art. The above specification, examples and data provide a complete description of the structure and use of exemplary embodiments of the disclosure. Although various embodiments of the disclosure have been described above with a certain degree of particularity, or with reference to one or more individual embodiments, those with ordinary skill in the art could make numerous alterations to the disclosed embodiments without departing from the spirit or scope of this disclosure, and the scope thereof is determined by the claims that follow.

What is claimed is:

1. A method for processing images, comprising:
obtaining a current frame and a previous frame;
performing uni-directional motion estimation with respect to the current frame and the previous frame for obtaining an initial motion vector;
performing a motion compensation process with respect to the current frame, the previous frame, and the initial motion vector for obtaining an interpolated frame;
determining the search center and block size of each of the interpolated blocks based on the interpolated frame;
calculating and obtaining a plurality of second motion vectors corresponding to a plurality of target blocks in the current frame symmetrically through using the interpolated block as a center;
calculating and obtaining a plurality of third motion vectors corresponding to the second motion vectors in the previous frame;
obtaining a plurality of distance values by performing a motion trajectory calibration process with respect to the second motion vectors and the third motion vectors; and
obtaining a minimum distance value from the distance values by comparing the distance values and performing a bi-directional motion compensation process with respect to the motion trajectory corresponding to the minimum distance value obtained from the distance values.

2. The method for processing images according to claim 1, further comprising:
setting a compensation range, wherein the compensation range is half of the search range,
wherein the step of calculating and obtaining a plurality of second motion vectors corresponding to a plurality of target blocks in the current frame symmetrically through using the interpolated block as the center comprises calculating and obtaining a plurality of second motion vectors corresponding to a plurality of target blocks symmetrically in the compensation range of the current frame through using the interpolated block as a center.

3. The method for processing images according to claim 1, wherein the distance values are generated from the following formula:

$$dist(T, C) = \frac{5}{8}MV_{1g}(x, y) - \frac{1}{8}MV_{2g}(x + v_x, y + v_y) + (\text{off}_x, \text{off}_y),$$

where $MV_{1g}$ is the second motion vector, $MV_{2g}$ is the third motion vector, (x,y) is the coordinate of the target block in the current frame, $(v_x,v_y)=MV_{1g}(x,y)$ and $(x+off_x,y+off_y)$ is the coordinate of the interpolated block in the interpolated frame.

4. The method for processing images according to claim 1, wherein the step of performing the uni-directional motion estimation comprises:
   dividing the current frame and the previous frame into a plurality of blocks according to a predetermined block size;
   the current frame and the previous frame respectively comprising a motion search range, of the motion search ranges, performing a sum of absolute difference algorithm with respect to each of base blocks selected from the blocks and each candidate block selected from the blocks to generate a plurality of sum of absolute differences; and
   obtaining the minimum sum of absolute difference from the sum of absolute differences by comparing the sum of absolute differences, and calculating and obtaining the initial motion vector according to the base block which is used to calculate the minimum sum of absolute difference and the candidate block.

5. The method for processing images according to claim 1, further comprising:
   determining which distance values are less than a predetermined value for obtaining the distance values which are less than the predetermined value, wherein the distance values are defined as a plurality of the nearest distance values;
   performing bi-directional motion estimation with respect to the motion vector which is used to calculate and obtain the nearest distance values to obtain a plurality of bi-directional sum of absolute differences;
   performing an adaptive sum of color-oriented particle distance algorithm with respect to the motion vector which is used to calculate and obtain the nearest distance values to obtain a plurality of adaptive sum of color-oriented particle distances;
   adding corresponding one of the bi-directional sum of absolute differences and the adaptive sum of absolute differences up and determining which one is the smallest to obtain the motion vector corresponding to the smallest one; and
   performing a bi-directional motion compensation with respect to the motion vector.

6. The method for processing images according to claim 5, wherein the adaptive sum of color-oriented particle distance (ASCOPD) is generated by the following formula:

$$ASCOPD(dx+dy) = \sum_{(x,y) \in S} dist(f_{n-1}(x-dx, y-dy), f_n(x, y)) + A(dx, dy),$$

$$A(dx, dy) = (dx^2 + dy^2) + BSME^2,$$

where $f_{n-1}$ is the previous frame, $f_n$ is the current frame, (x,y) is the coordinate of the target block in the current frame, and BSME is the block size of the motion estimation.

7. The method for processing images according to claim 5, wherein the bi-directional sum of absolute difference (BSAD) is generated from the following formula:

$$BSAD = dist(f_{n-1}\{(x, y) + MV_{bi-direct}\}, f_n\{(x, y) - MV_{bi-direct}\}),$$

$$dist(f_{n-1}(B_1), f_n(B_2)) = [|Y_{n-1}(B_1) - Y_n(B_2)| + W(|Cr_{n-1}(B_1) - Cr_n(B_2)| + |Cb_{n-1}(B_1) - Cb_n(B_2)|) \forall \ W \in \aleph]$$

$$MV_{bi-direct} = \frac{1}{2} \times \arg\{\min(dist(\text{traj\_entry\_pt, cur\_interp\_block}))\},$$

$$B_1 = (x, y) + MV_{bi-direct},$$

$$B_2 = (x, y) - MV_{bi-direct},$$

where (x,y) is the coordinate of the current interpolated block in the interpolated frame, $Y_{n-1}$, $Y_n$, $Cr_{n-1}$, $Cr_n$, $Cb_{n-1}$, $Cb_n$ are the chrominance compositions of YCrCb color space in the current frame $f_n$ and the previous frame $f_{n-1}$, W is an integer, and cur_interp_block is the location of the current interpolated block.

8. The method for processing images according to claim 1, further comprising:
   performing a reducing process with respect to the image of the current frame and the previous frame twice to generate an image with three resolution levels, wherein the resolution level the image of the current frame and the previous frame locates is the first resolution level, the resolution level is the second resolution level if the resolution level has been reduced once, and the resolution level is the third resolution level if the resolution level has been reduced twice;
   performing motion estimation with respect to the image located at the third resolution level to generate the initial motion vector;
   enlarging the initial motion vector according to the size of the second resolution level and performing a motion vector refinement process with respect to the second resolution level to thereby generate a fourth motion vector according to the initial motion vector; and
   enlarging the fourth motion vector according to the size of the first resolution level and performing the motion vector refinement process with respect to the first resolution level to thereby generate a fifth motion vector according to the fourth motion vector.

9. The method for processing images according to claim 8, further comprising:
   performing the motion vector refinement process with respect to the second resolution level and the first resolution level by a median filter.

10. The method for processing images according to claim 9, wherein the median filter is defined as the following formula:

$$MV_{1g\_med} = \arg\left[\min_{(dx,dy) \in N_{MVc}} \left(\sum_{(i,j) \in N_{MVc}} dist(MV(dx, dy), MV(i, j))\right)\right],$$

$$dist(MV_1, MV_2) = |X_{MV_1} - X_{MV_2}| + |Y_{MV_1} - Y_{MV_2}|,$$

$$(dx, dy) \in [-2, 2], (i, j) \in [-2, 2],$$

where $MV_{1g\_med}$ is the candidate motion vector refined by the median filter, $N_{MVc}$ is the union of 25 neighboring and current motion vectors, and $(dx,dy) \in [-2,2]$ and $(i,j) \in [-2,2]$ are the indexes of neighboring and current motion vectors.

* * * * *